United States Patent
Bello

(10) Patent No.: US 9,587,199 B2
(45) Date of Patent: Mar. 7, 2017

(54) CRUDE OIL FRICTION REDUCER

(71) Applicant: Oil & Gas Tech Enterprises C.V., Noordwijk (NL)

(72) Inventor: Cridal Del Valle Sencial Bello, Edo Anzoategui (VE)

(73) Assignee: Oil & Gas Tech Enterprises C.V., Noordwijk (NL)

( * ) Notice: Subject to any disclaimer, the term of this patent is extended or adjusted under 35 U.S.C. 154(b) by 237 days.

(21) Appl. No.: 14/509,781

(22) Filed: Oct. 8, 2014

(65) Prior Publication Data

US 2016/0102267 A1    Apr. 14, 2016

(51) Int. Cl.
| C10M 159/00 | (2006.01) |
| F17D 1/17 | (2006.01) |
| C10M 135/08 | (2006.01) |
| C10M 135/10 | (2006.01) |
| C10M 177/00 | (2006.01) |

(52) U.S. Cl.
CPC ........ *C10M 159/00* (2013.01); *C10M 135/08* (2013.01); *C10M 135/10* (2013.01); *C10M 177/00* (2013.01); *F17D 1/17* (2013.01); *C09K 2208/28* (2013.01); *C10N 2210/01* (2013.01); *C10N 2230/06* (2013.01)

(58) Field of Classification Search
CPC ............................. C10N 2230/06; C10G 49/00
USPC .......................................................... 585/3
See application file for complete search history.

(56) References Cited

U.S. PATENT DOCUMENTS

| 2,799,646 A | 7/1957 | Lacey et al. |
| 4,737,295 A | 4/1988 | Cowan et al. |
| 5,863,301 A | 1/1999 | Grosso et al. |
| 2005/0194292 A1* | 9/2005 | Beetge ................. C10G 33/04 208/391 |
| 2005/0199395 A1* | 9/2005 | Berger .................. C09K 8/584 166/270.1 |
| 2014/0116690 A1* | 5/2014 | Bittner ................. C09K 8/584 166/270.1 |
| 2014/0238679 A1* | 8/2014 | Pope ..................... C10G 71/00 166/300 |
| 2014/0353250 A1* | 12/2014 | Semple ................. C09K 8/584 210/634 |
| 2014/0371115 A1* | 12/2014 | Hill ........................ C09K 8/86 507/261 |
| 2015/0011453 A1* | 1/2015 | Bennett ............... C11D 3/2006 510/402 |
| 2015/0014221 A1* | 1/2015 | Yoon ..................... C10G 1/045 208/390 |

OTHER PUBLICATIONS

Oil & Gas Tech Enterprises C.V., Heavy Crude Oil Viscosity Reducer, U.S. Utility Application, U.S. Appl. No. 14/509,696, filed Oct. 8, 2014.

* cited by examiner

*Primary Examiner* — Ellen McAvoy
(74) *Attorney, Agent, or Firm* — Schmeiser, Olsen & Watts LLP

(57) ABSTRACT

A crude oil friction reducer is disclosed. The friction reducer includes water soluble anionic surfactants as active components and non-aromatic solvents. The water soluble anionic surfactants include anionic sulfonate surfactant and an anionic sulfate surfactant, such as anionic sodium sulfate surfactant, dissolved in an aqueous chelating solution. The friction reducer may also include a pH adjuster. The friction reducer is used with heavy and extra heavy crude oil.

18 Claims, 2 Drawing Sheets

CRUDE OIL FRICTION REDUCER

BACKGROUND OF THE INVENTION

Technical Field

This invention relates to a method for manufacturing and applying a friction reducer with active components based on water soluble surfactants, to reduce friction of heavy and extra-heavy crude oil.

State of the Art

Heavy oil presents production challenges due to its high density and generally viscous nature. In the general equation for pipeline flow $\Delta p$ is dependent on density and friction factor:

$$\Delta p = \frac{1}{2} f \frac{\rho}{d} L u^2 \quad (1)$$

Where:
$\Delta p$=differential pressure in the pipe;
f=friction factor of the fluid;
$\rho$=density of the fluid;
d=pipe diameter;
L=length of pipe, and
u=velocity of the fluid flowing through the pipe.

While the density of heavy oils varies within about ±10% of the average, the friction factor may vary by several orders of magnitude. The friction factor is dependent on both density and viscosity, but the relationship changes as the flow regime changes.

The Reynold's number is used to determine whether the flow in a pipeline is laminar, transitional or turbulent. The Reynolds number Re is given by:

$$Re = \frac{\rho d u}{\mu} \quad (2)$$

Where:
$\rho$=density of the fluid;
d=pipe diameter;
u=flow velocity, and
$\mu$=fluid viscosity.

At high viscosity levels, the pressure drop in pipelines may become economically prohibitive, or even prevent flow altogether. Pressure drop is the difference between the pressures at two different points in the pipeline. Pressure drop occurs when frictional forces, caused by the resistance to flow, act on the crude oil as it flows through the pipeline. Pressure drop increases proportionally to the frictional shear forces within the pipeline. High crude oil viscosities result in a large pressure drop. The main factors contributing to fluid flow resistance, viscosity and frictional forces result in increased pumping energy. In fact, one of the most important issues in the heavy oil production side is represented by the high cost of pumping energy required.

The viscoelastic rheology of heavy oil increases the friction forces in the pipeline, yielding an inefficient use of the energy used to pump the heavy oil through the pipeline, which worsens when temperature becomes lower.

Conventional methods for reducing high values of pressure drop in the pipeline include partial upgrading of the oil, dilution of the oil, heating of the oil, and usage of high molecular weight polymers as an additive to the oil. These methods enable changes in the original properties of the heavy or extra-heavy crude oil, yielding lower viscosity and friction reduction. However, these methods are economically infeasible and not totally efficient.

High molecular weight polymers are referred to as drag reducer additives (DRA). These additives are usually long chain and high molecular weight polymers added to the flow in turbulent regimens to enable a reduction of friction forces.

DRAs inhibit the formation of turbulent burst and prevent turbulence from being formed in the pipeline oil, or at least reduce the degree of turbulence, and in turn, reduce the drag or pressure loss. The drag reducer additive polymers are believed to stretch in the oil flow, absorbing the energy in the streak, thereby preventing turbulent burst in the oil. In general, the higher the degree of turbulence of the fluid in the pipeline, the more necessary the drag reducing additives. However, one limitation for the DRA polymers is that degradation can occur during the flow. Because of the pressure and temperature on the polymers, it is easier to break them down. Because of this, the drag reducing agent usually is re-injected after pumps and turns, where the pressure and temperature drops can be extra high.

Currently, producing and transporting heavy crude often requires the addition of diluting agents or diluents, such as, light crude, diesel, aromatic solvents, naphtha, and/or gasoline. These diluents behave as viscosity reducers or DRAs, albeit their high costs and volume required (e.g. 1 barrel of diluent per 3 barrels of heavy oil) increases the cost of the oil. Therefore, there is a need to find new additives to minimize diluent costs.

Accordingly, what is needed is a method of reducing friction in heavy and extra heavy crude oil, which yields savings by reducing the consumption of pumping energy and increasing the oil production rate.

DISCLOSURE OF THE INVENTION

The disclosed invention relates to a friction reducer composition comprising water soluble anionic surfactant dissolved in aqueous chelating solution of inorganic sodium salt.

Disclosed is a method for reducing the friction in hydrocarbon fluid, comprising treating the hydrocarbon fluid with a friction reducer composition comprising water soluble anionic surfactant dissolved in aqueous chelating solution of inorganic sodium salt.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

Figure 1:
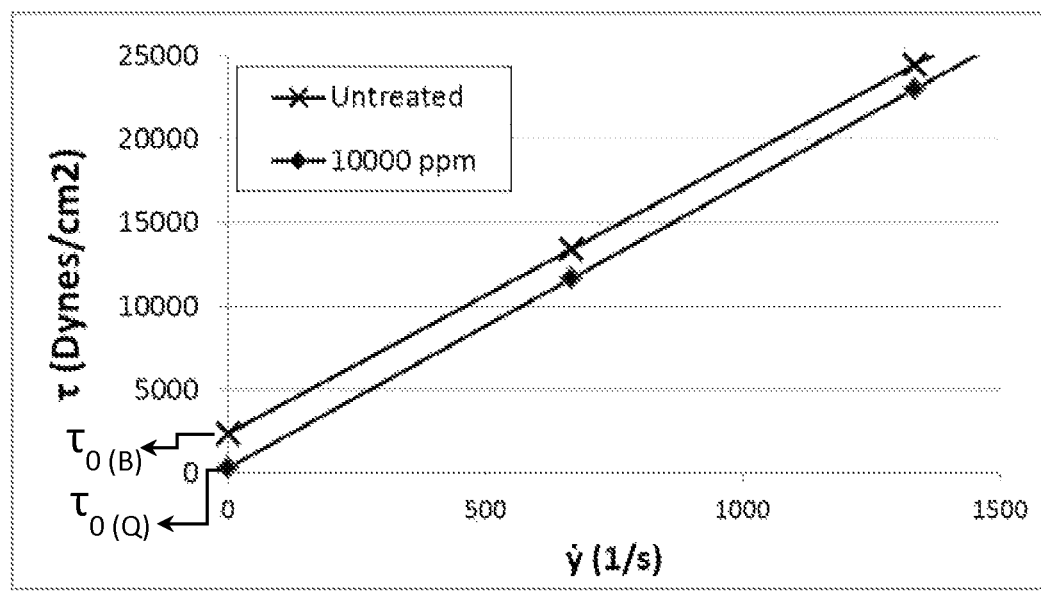
FIG. 1 shows the performance results of the friction reducer of Example 1.

As discussed above, embodiments of the disclosed invention relate to a friction reducer composition and a method of reducing friction in heavy and extra heavy crude oils.

This invention relates to a friction reducer composition that is not based on polyolefins, polyacrylamides, or polyacrylates. With water soluble anionic surfactants as active components, and non-aromatic solvents in the friction reducer composition, the disclosed invention produces a satisfactory friction reduction in heavy and extra-heavy crude oil in producer oil wells and/or in pipelines that transport multiphase/monophasic fluids.

The friction reducer composition comprises water soluble anionic surfactant dissolved in aqueous chelating solution of inorganic sodium salt. The friction reducer composition further comprises pH adjuster.

Suitable water soluble anionic surfactants include, but are not limited to, water soluble anionic surfactants containing anionic functional groups, such as sulfonates; sulfates, such as alkyl sulfates; phosphates; carboxylates; and/or mixtures thereof. Generally, the water soluble anionic surfactant is a water soluble anionic sulfonate surfactant, a water soluble sulfate surfactant and/or mixtures thereof. Suitable water soluble anionic surfactants of alkyl sulfates include, but are not limited to, water soluble anionic sodium sulfate surfactants, such as anionic alkyl ether sodium sulfate surfactant.

In one embodiment, the friction reducer composition comprises water soluble anionic sulfonate surfactant and water soluble anionic sodium sulfate surfactant. Generally, the amount of water soluble anionic surfactant is in the range of from about 5% to about 15% by weight.

The anionic sulfonate surfactant is dissolved in a water solution of a chelating agent of a sodium salt. Generally, the amount of this water solution chelating agent is in the range of from about 60% to about 80%, by weight.

The water solution chelating agent is a sodium salt dissolved in water in an amount in the range of from about 60 to about 80% by weight, such as sodium polyphosphate.

Suitable pH adjusters include, but are not limited to, caustic metallic bases. Generally the amount of pH adjuster is in the range of from about 5% to about 10% by weight.

The disclosed friction reducer does not rely on aromatic base solvents, such as toluene, xylene, and/or INSOL 54 (58% V/V aromatic content, according to COVENIN Venezuelan Standard 2723) and/or INSOL 88 (95% V/V aromatic content, according to COVENIN Venezuelan Standard 2723).

The method of making the disclosed friction reducer composition comprises, forming a sodium salt water soluble chelating solution, at room temperature and a constant agitation rate, within the range of about 400 RPM to about 600 RPM using a paddle blender. Then, the pH adjuster is slowly poured in the chelating solution, at the same temperature and agitation rate as mentioned above. Then, the anionic sodium sulfate surfactant and the anionic sulfonate surfactant are poured, with constant stirring until a homogenized blend is formed. Once a homogenized blend is observed, the blend is left resting for at least 30 minutes, or until the foam disappears completely. A sample is analyzed to assess conformity according to a specific gravity at 25° C. of 1.037±0.030.

The disclosed friction reducer may be used to treat hydrocarbon fluids, such as extra-heavy (API gravity in the range of from 7 to about 12) and heavy (API gravity in the range of about 12 to about 22) crude oil. The friction reduction is based on anionic surfactants, using water as external phase, with non aromatic solvents present in the formulation, developed with a satisfactory performance to reduce friction, for use with heavy and extra-heavy crude oil. For example, crude oils from the Orinoco Belt—Venezuela, shows a friction drop effect, up to about 85% reduction in the Yield stress for a Bingham plastic fluid, and up to about 40% total reduction in the shear stress for a pseudo plastic fluid with the disclosed friction reducer composition.

The disclosed friction reducer may be used to reduce friction in hydrocarbon fluids having water content in the range of about 1% to about 90%. The disclosed friction reducer may be used with monophasic flows, which consider only the liquid phase, comprised of hydrocarbons and water (brine), and multiphase flows which include the gas phase in addition to the liquid phase. The liquid phase of the hydrocarbon fluid comprises solids, sediments, sands, direct emulsions, or reverse emulsions, and/or mixtures thereof.

In the disclosed invention, with water soluble anionic surfactants as active components, a friction reduction is achieved by changes in the physical-chemical interaction between the fluid (crude oil) and the pipeline wall, exchanging the contact wall/crude oil system at the most extensive area possible, for a wall/water/oil system, where crude oil is under dramatically less frictional forces and flowing at a higher velocity.

The presence of hydrophilic head groups, which are attracted to water, in the surfactant molecules, enable the molecules to create a thin water film, which contact the wall and forces the oil to "skate" on it. The hydrophobic chains (or tails), which are repelled by water, in the surfactant molecules work keeping apart the oil from the wall, wetted in water.

Generally, the crude oil is treated with the disclosed friction reducer at a concentration in the range of from about 500 ppm to about 10000 ppm.

The friction reduction effect is achieved by the direct injection of the disclosed friction reducer into a pipeline wherein the hydrocarbon fluid to be treated is going to flow. The active anionic surfactants in the disclosed friction reducer are able to yield the tension changes needed to force the water to contact the wall pipe. Thereby, the hydrocarbon fluid is wetted in a water layer, and it is the water phase which is going to contact the wall, exchanging the original fluid pattern with a specific velocity distribution, to a piston flow pattern wherein there is a peak velocity nearby the pipe wall, due to the friction reduction effect, yielding a more constant velocity profile.

The method of reducing the friction in extra heavy and heavy crude oils includes the direct injection of the disclosed friction reducer into the crude oil to be treated, through an injection quill installed in a pipeline. Alternatively, the disclosed friction reducer may be injected into the pipeline using single valves located at 3 or 6 o'clock positions on the pipeline. This method may be used at many different stages of the crude oil transportation process, including flow pipelines, collector pipelines, or the main pipeline. The location of the injection point for the disclosed friction reducer may be at any point in the transportation system based on pressure drop behavior and crude oil viscosity.

Petroleum fluids are immensely complex mixtures of hydrocarbon compounds, ranging from the simplest gases like methane, to large asphaltenic molecules with molecular weights of thousands. This chemical variation is reflected in a large variation of viscosities, ranging from fraction to millions of centipoise, and rheological behavior, from perfectly Newtonian to highly non-Newtonian, viscoelastic and nearly solid-like. Many researchers have coincided through several investigations regarding the heavy oil as a low-temperature non-Newtonian fluid. The friction reducer disclosed in the invention is focused on applicability at low temperatures, for instance usually below 60° C. for heavy and extra heavy oils, fluidity is more affected by an increment of friction forces, due to an asymptotic increment of viscosity.

Friction reduction may be measured, for example, by using the viscometer CAP 2000+L, and CapCalc 32 software. Through this software, fluid behavior can be reproduced by non-Newtonian models, such as the Bingham and the Power law equations. Through the tests performed using the disclosed friction reducer and samples of crude oil as described below, these models displayed a reliable relationship, with correlation coefficients from about 85% to about 99%, considered suitable to reproduce the rheological behavior observed. These models incorporate the concept of Yield stress and viscosity. Yield stress is the stress that must be overcome before the fluid will flow. Viscosity varies as a function of shear rate. Crude oils possess complex flow behavior in which the shear stress depends on the rate of shear and on the time for which the shear has been applied.

Visco plastic fluid can be modeled by the Bingham equation:

$$\tau = \tau_0 + \eta \dot{y} \quad (3)$$

Where:
$\tau$=Shear stress of the fluid;
$\tau_0$=Yield stress of the fluid;
$\eta$=Viscosity of the fluid; and
$\dot{y}$=Shear rate (velocity) of the fluid.

Viscoplasticity is characterized by a yield stress, below which the materials will not deform, and above which they will deform and flow according to different constitutive relations. On the other hand, pseudo plastic fluids, are characterized by shear stress. Shear stress in an elastic fluid is caused by a shear which tends to make different sections or layers of the fluid move in different directions. Pseudo plastic fluids can be modeled by the Power law, given by:

$$\tau = m\dot{y}^n \quad (4)$$

Where:
$\tau$=Shear stress;
m=flow consistency index; and
n=flow behavior index.

Power law fluids can be subdivided into three different types of fluids based on the value of their flow behavior index:
1) n<1: Pseudo plastic
2) n=1: Newtonian Fluid
3) n>1: Dilatant (less common)

Example 1

Extra heavy crude oil (from Ayacucho Field, 16 API, diluted with naphtha) is treated with a friction reducer according to the disclosed invention and the viscosity is measured using a rotational Brookfield-CAP2000+L viscometer under the following parameters:
Temperature: 25° C.;
Rotational Speed: 50-400 RPM;
Concentration: 10000 ppm;
$\tau_0$ (B): Yield stress of untreated extra heavy crude oil; and
$\tau_0$ (Q): Yield stress of extra heavy crude oil treated with the friction reducer.

The flow and rheological properties (shear stress/shear rate relationship) have been determined for untreated and friction reducer treated (10000 ppm) crude oil. The rheological characteristics of the crude show a visco plastic behavior, and the Bingham equation fits the lab measurements, with a correlation coefficient of 99%. FIG. 1 is a rheogram (a plot of the shear stress versus the shear rate of a fluid) of the extra heavy crude oil treated with the friction reducer and the untreated extra heavy crude oil. FIG. 1 shows in the y axis the shear stress estimated by Capcalc 32 software using the Bingham equation, and the x axis with the shear rate estimated as well, according to the increments of the viscometer rotational speed within the RPM range established (50 to 400 RPM). FIG. 1 shows a typical linear correlation of both mentioned variables as the Bingham equation estimates. Within the elastic zone (no permanent deformation) of the flow curve, an 85% reduction for the Yield stress from $\tau_0$ (B)=2435 Dynes/cm$^2$ to $\tau_0$ (Q)=360 Dynes/cm$^2$ is reached.

Figure 2:
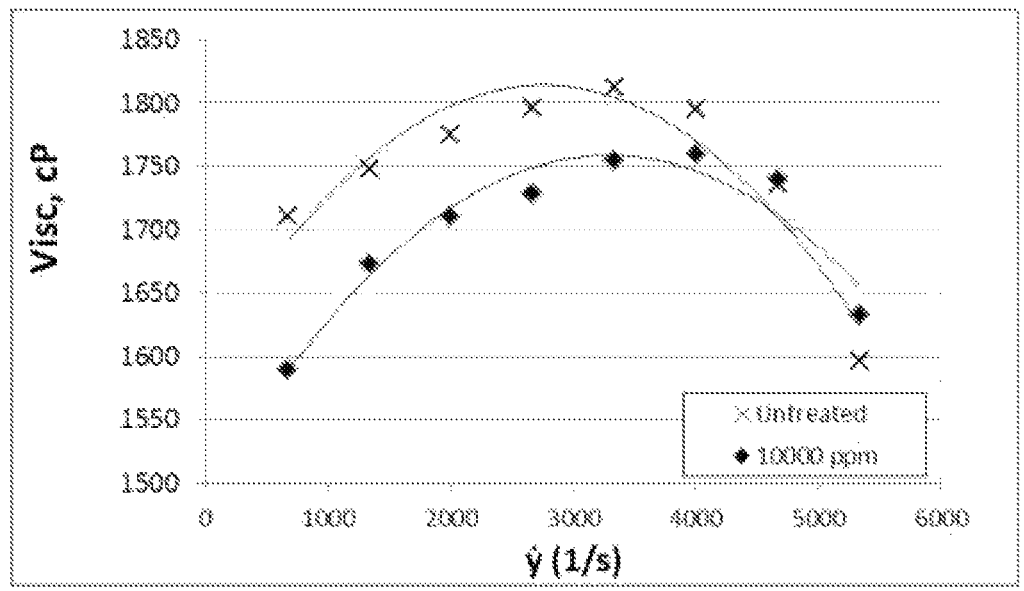
FIG. 2 shows additional performance results of the friction reducer of Example 1.

Example 1 shows a reduction in total energy required to enable the deformation of the fluid. Thus by reduction of friction, there is a reduction in total energy required to start the flow, with no appreciable changes in internal resistance of the fluid to flow. FIG. 2 shows viscosity versus shear rate for the untreated extra heavy crude oil and the treated extra heavy crude oil. As can be seen in FIG. 2, the viscosity of the untreated extra heavy crude oil versus the treated extra heavy crude oil does not vary significantly, with an average of about 3% of the difference between viscosity of treated and untreated fluid.

Example 2

Extra heavy crude oil (diluted with naphtha from Junin Field, 10 API) is treated with a friction reducer according to the disclosed invention and the viscosity is measured using a rotational Brookfield-CAP2000+L viscometer under the following parameters:
Temperature: 25° C.;
Rotational Speed: 50-400 RPM; and
Concentration: 10000 ppm.

Figure 3:
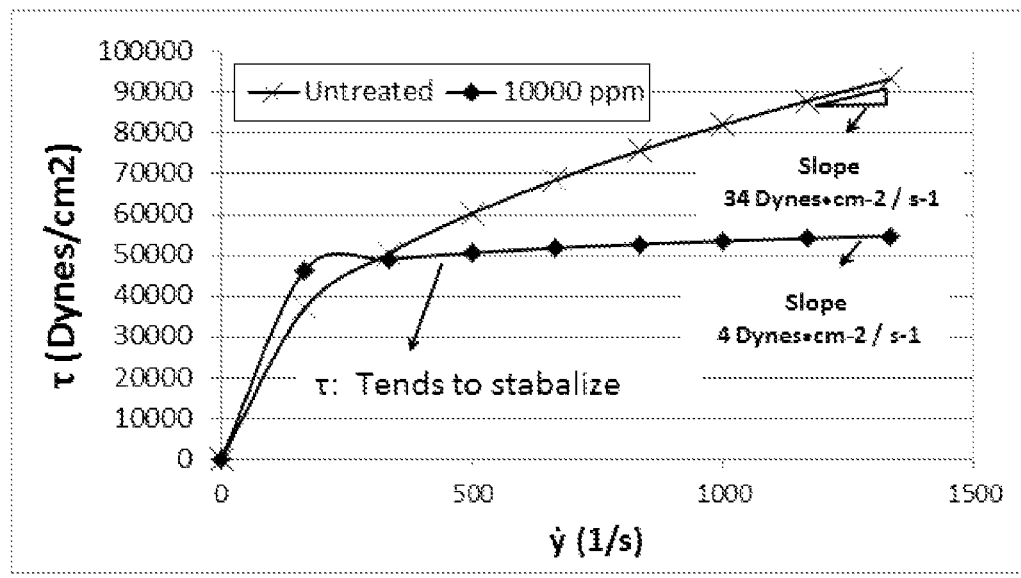
FIG. 3 shows the performance results of the friction reducer of Example 2.

FIG. 3 is a rheogram (a plot of the shear stress versus the shear rate of a fluid) of the extra heavy crude treated with the friction reducer (10000 ppm) and the untreated extra heavy crude oil. FIG. 3 shows in the y axis the shear stress estimated by Capcalc 32 software using the Power law equation, and the x axis with the shear rate estimated as well, according to the increments of the viscometer rotational speed within the RPM range established (50 to 400 RPM). Lab measurements are correlated by Power law equation with a correlation coefficient of 88%. FIG. 3 shows a typical pseudo plastic behavior, thinning the shear stress without the initial resistance to deformation, with a linear (Newtonian) behavior at the highest levels of stress and shear rate. FIG. 3 shows at the highest levels of shear rate (from 1000 s$^{-1}$ to 1333 s$^{-1}$), a shear stress/shear rate-slope, for the untreated fluid plot, equal to 34 Dynes·cm$^{-2}$/s$^{-1}$, while the treated fluid plot has a slope of 4 Dynes·cm$^{-2}$/s$^{-1}$. Thereby, friction forces are reduced by 88% in the crude oil treated, vs. untreated oil, per every unit of change in deformation speed to be reached.

Within the shear rate range evaluated, the friction reducer is able to reduce the shear stress up to about 40%.

Figure 4:
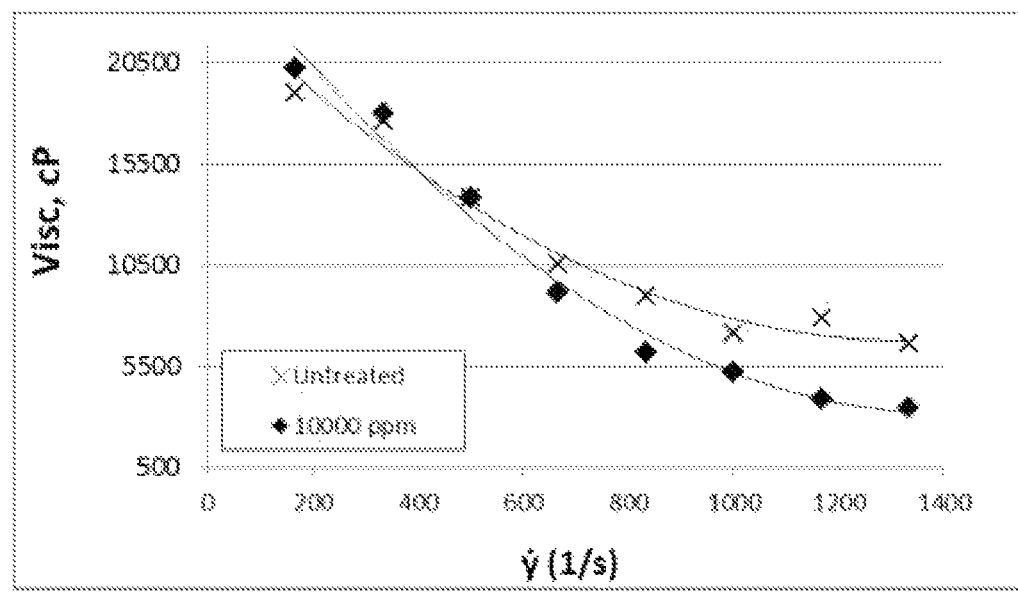
FIG. 4 shows additional performance results of the friction reducer of Example 2.

FIG. 4 shows viscosity versus shear rate for the untreated extra heavy crude oil and the treated extra heavy crude oil. As can be seen in FIG. 4, the viscosity of the treated fluid tends to be reduced by about 40%, compared with the untreated fluid viscosity, while shear rate is increased.

Example 3

A visual test is performed to identify changes in wettability by treatment of a crude oil having an API of 16 with a friction reducer based on the disclosed water soluble anionic surfactants, and comparing the wettability of this treated oil with the wettability of oil treated with conventional water soluble friction reducers based on nonyl phenol ethoxylated surfactants.

For each friction reducer, a concentration of 10000 ppm (based on 50 ml crude oil), is spread over the internal surface of the glass bottle. Then, 50 ml of the crude oil is poured into the glass bottle at room temperature and the bottle is strongly agitated 10 times. Immediately, the bottle is placed upside down. Observations are made during an elapsed time of 30 minutes, for the treated fluid with the friction reducer disclosed in the invention:

- internal surface of the bottle avoids being wetted in oil;
- internal surface of the bottle stays clean, while fluid treated with nonyl phenol ethoxylated surfactants, are not able to keep the internal surface of the bottle oil free;
- after putting the bottle upside down, most of the oil flows to the bottom quickly (about 10 seconds), as compared to fluid treated with nonyl phenol ethoxylated surfactants which fluid flows much slower (about 10 minutes),
- not seeing any emulsion originated, observed on the surface of the bottle;
- not seeing any water drops in the liquid; and
- not seeing any separation of water phase.

Results may vary according to different oils, and the dosage used. The same visual test is performed on 8 API gravity oils, making the oil able to flow by treating with the disclosed friction reducer at doses from 2000 ppm to 10000 ppm at 25° C. The same flow is not achieved using friction reducers based on nonyl phenol ethoxylated surfactants. Results show a better performance in terms of changes in wettability from oil to water using the disclosed friction reducer based on water soluble anionic surfactants.

The embodiments and examples set forth herein were presented in order to best explain the disclosed invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A friction reducer composition for hydrocarbon fluids, the friction reducer composition comprising water soluble anionic surfactant dissolved in aqueous chelating solution of inorganic sodium salt, wherein the aqueous chelating solution of inorganic sodium salt is a sodium polyphosphate.

2. The friction reducer composition of claim 1, wherein the water soluble anionic surfactant is selected from the group consisting of water soluble anionic sulfonate surfactant, water soluble anionic sulfate surfactant, and/or mixtures thereof.

3. The friction reducer composition of claim 2, wherein the water soluble anionic sulfate surfactant is a water soluble anionic sodium sulfate surfactant.

4. The friction reducer composition of claim 1, wherein the water soluble anionic surfactant is a mixture of water soluble anionic sulfonate surfactant and water soluble anionic alkyl ether sodium sulfate surfactant.

5. The friction reducer composition of claim 1, further comprising pH adjuster.

6. The friction reducer composition of claim 5, wherein the pH adjuster is a caustic metallic base.

7. A method for reducing friction in a hydrocarbon fluid comprising treating the hydrocarbon fluid with a friction reducer composition comprising water soluble anionic surfactant dissolved in aqueous chelating solution of inorganic sodium salt, wherein the aqueous chelating solution of inorganic sodium salt is a sodium polyphosphate.

8. The method of claim 7, wherein the water soluble anionic surfactant is selected from the group consisting of water soluble anionic sulfate surfactants, water soluble anionic sulfonate surfactants, and/or mixtures thereof.

9. The friction reducer composition of claim 8, wherein the water soluble anionic sulfate surfactant is a water soluble anionic sodium sulfate surfactant.

10. The method of claim 7, wherein the water soluble anionic surfactant is a mixture of water soluble anionic sulfonate surfactant and water soluble anionic alkyl ether sodium sulfate surfactant.

11. The method of claim 7, wherein the friction reducer composition further comprises pH adjuster.

12. The method of claim 7, wherein the friction reducer composition is injected directly into the hydrocarbon fluid.

13. The method of claim 7, wherein the friction reducer composition is in a concentration in the range of from about 500 ppm to about 10000 ppm.

14. The method of claim 11, wherein the friction reducer composition is in a concentration of about 10000 ppm.

15. The method of claim 7, wherein the hydrocarbon fluid is a heavy crude oil having an API gravity in the range of from about 7 to about 12.

16. The method of claim 7 wherein the hydrocarbon fluid is an extra heavy crude oil having an API gravity in the range of from about 12 to about 22.

17. The method of claim 7, wherein the hydrocarbon fluid shows a pseudo plastic behavior and up to about a 40% reduction in shear stress in response to the treating of the hydrocarbon fluid with the friction reducer.

18. The method of claim 7, wherein the hydrocarbon fluid shows a Bingham plastic behavior and about an 85% reduction in yield stress in response to the treating of the hydrocarbon fluid with the friction reducer.

* * * * *